United States Patent
Yassin et al.

(10) Patent No.: US 8,584,079 B2
(45) Date of Patent: Nov. 12, 2013

(54) QUALITY ON SUBMIT PROCESS

(75) Inventors: Ohad Yassin, Tel Mond (IL); Nir Koren, Ra'annana (IL); Eran Nelinger, Kfar Yona (IL); Asaf Saar, Tel Mond (IL)

(73) Assignee: SAP Portals Israel Ltd, Ra'anana (IL)

(*) Notice: Subject to any disclaimer, the term of this patent is extended or adjusted under 35 U.S.C. 154(b) by 393 days.

(21) Appl. No.: 12/970,474

(22) Filed: Dec. 16, 2010

(65) Prior Publication Data

US 2012/0159420 A1 Jun. 21, 2012

(51) Int. Cl.
G06F 9/44 (2006.01)

(52) U.S. Cl.
USPC .................................................. 717/101

(58) Field of Classification Search
USPC .................................................. 717/101
See application file for complete search history.

(56) References Cited

U.S. PATENT DOCUMENTS

| | | | |
|---|---|---|---|
| 7,503,037 B2 * | 3/2009 | Banerjee et al. | 717/124 |
| 7,840,944 B2 * | 11/2010 | Brunswig et al. | 717/124 |
| 2006/0184918 A1 * | 8/2006 | Rosaria et al. | 717/124 |
| 2007/0006041 A1 * | 1/2007 | Brunswig et al. | 714/38 |
| 2007/0028217 A1 * | 2/2007 | Mishra et al. | 717/124 |
| 2007/0083650 A1 * | 4/2007 | Collomb et al. | 709/224 |
| 2007/0234300 A1 * | 10/2007 | Leake et al. | 717/124 |
| 2008/0256554 A1 * | 10/2008 | Yassin | 719/315 |
| 2009/0055804 A1 * | 2/2009 | Blaschek et al. | 717/126 |
| 2009/0070734 A1 * | 3/2009 | Dixon et al. | 717/102 |
| 2009/0300580 A1 * | 12/2009 | Heyhoe et al. | 717/106 |
| 2010/0131710 A1 | 5/2010 | Yassin | |
| 2012/0159420 A1 * | 6/2012 | Yassin et al. | 717/101 |

OTHER PUBLICATIONS

Wikipedia [online] "Hudson (software)" Last modified Oct. 16, 2010 [Retrieved from the Internet Dec. 16, 2010 ]<URL:http://en.wikipedia.org/wiki/Hudson_(software)>.
Sonar [online] "Put your technical debt under control" [Retrieved from the Internet Dec. 16, 2010] <URL:http://www.sonarsource.org/>.
Wikipedia [online] "JUnit" Last modified Apr. 8, 2010 [Retrieved from the Internet Dec. 16, 2010] <URL:http://en.wikipedia.org/wiki/JUnit>.
Wikipedia [online] "HP Quick Test Professional" Last modified Dec. 15, 2010 [Retrieved from the Internet Dec. 16, 2010] <URL:http://en.wikipedia.org/wiki/HP_QuickTest_Professional>.

* cited by examiner

*Primary Examiner* — Don Wong
*Assistant Examiner* — Theodore Hebert
(74) *Attorney, Agent, or Firm* — Fish & Richardson P.C.

(57) ABSTRACT

The present disclosure involves systems, software, and computer implemented methods for providing a quality on submit process. One process includes operations for monitoring a source control system for submissions of new source code and determining that new source code has been submitted by a user to the source control system. A request to perform a quality control task for the new source code is sent to at least one quality control application. A report from the quality control application regarding results of the quality control task is received. A general report of results of each quality control task performed by each of the at least one quality control application is generated. The general report is sent to the user.

20 Claims, 6 Drawing Sheets

| TIME | PROJECT | USER | CHANGE | BUILD | DEPLOYMENT | JUNIT | SONAR |
|---|---|---|---|---|---|---|---|
| 11-1-2010 17:40 | 6Degrees | i052901 - Ryan Johnson | 3137142 | Passed | Passed | Failed | Passed |
| 11-1-2010 17:20 | 4.0_Build | i041381 - Billy Smith | 3137136 | Passed | Passed | | Passed |
| 11-1-2010 17:15 | 4.1-Build | i041381 - Billy Smith | 3137133 | Passed | Passed | Passed | Passed |
| 11-1-2010 16:21 | 6Degrees | i064039 - Niki Robinson | 3137115 | Passed | Failed | Failed | Failed |
| 11-1-2010 16:13 | 6Degrees | i064039 - Niki Robinson | 3137001 | Failed | Passed | Passed | Passed |
| 11-1-2010 16:10 | 4.1-Build | i041381 - Billy Smith | 3136843 | Passed | Passed | Failed | Passed |
| 11-1-2010 15:33 | 6Degrees | i052901 - Ryan Johnson | 3136480 | Passed | Failed | Passed | Passed |
| 11-1-2010 14:33 | 4.1-Build | | Manual | Passed | Failed | | Passed |
| 11-1-2010 14:17 | 6Degrees | i064039 - Niki Robinson | 3136438 | Passed | Passed | Passed | Passed |
| 11-1-2010 13:51 | 4.1-Build | i059751 - Anna Jordan | 3136413 | Passed | Passed | Failed | Passed |
| 11-1-2010 13:49 | 6Degrees | i041381 - Billy Smith | 3136415 | Passed | Passed | Passed | Passed |
| 11-1-2010 13:51 | 4.1-Build | i059751 - Anna Jordan | 3136413 | Passed | Passed | Passed | Passed |
| 11-1-2010 11:30 | 4.1-Build | i041381 - Billy Smith | 3136274 | Passed | Passed | Passed | Passed |
| 11-1-2010 11:30 | 4.1-Build | i041381 - Billy Smith | 3136274 | Passed | Passed | Passed | Passed |
| 11-1-2010 11:30 | 4.1-Build | i041381 - Billy Smith | 3136274 | Passed | Passed | Passed | Passed |
| 11-1-2010 11:30 | 4.1-Build | i041381 - Billy Smith | 3136274 | Passed | Passed | Passed | Passed |
| 11-1-2010 11:30 | 4.1-Build | i041381 - Billy Smith | 3136274 | Passed | Passed | Passed | Passed |
| 11-1-2010 11:30 | 4.1-Build | i041381 - Billy Smith | 3136261 | Passed | Passed | Passed | Passed |
| 11-1-2010 11:14 | 4.1-Build | ioceng | | | | | |
| 11-1-2010 09:38 | 4.1-Build | i034984 - Scott Davis | 3136170 | Passed | Passed | Passed | Passed |

QUALITY ON SUBMIT PROCESS

TECHNICAL FIELD

The present disclosure relates to software, computer systems, and computer implemented methods for providing a quality on submit process.

BACKGROUND

Software developers frequently make changes to code throughout the development process of software applications. In some instances, multiple software developers can work on the same project in coordination or in parallel. A developer may revise or create new software code in isolation from other portions of code for the same application and then, once completed, submit the code for incorporation into the overall code for the application. The developer can submit a changelist, for example, detailing the changes to a particular portion of code.

The new portions of code, however, may contain bugs or errors. Further, detection of the bugs may not occur until much later in the software development process, resulting in costly fixes and requiring extensive repairs to affected portions of the software code. In particular, escalation situations during a software application's validation process or during very late stages in the development lifecycle can require extensive resources to remedy a problem. Although certain tools exist that can be used to detect software bugs, the tools may not be adequate to detect the errors in the code sufficiently early in the development lifecycle to efficiently fix the problems. Further, the tools used to address software bugs may be used piecemeal on different portions of the software application at different points during the development lifecycle, resulting in an incomplete or uncoordinated analysis of software.

SUMMARY

The present disclosure describes techniques for providing a quality on submit process. A computer program product is encoded on a tangible storage medium, where the product comprises computer readable instructions for causing one or more processors to perform operations. These operations can include monitoring a source control system for submissions of new source code and determining that new source code has been submitted to the source control system by a user. A request to perform a quality control task for the new source code is sent to at least one quality control application. A report from the quality control application regarding results of the quality control task is received. A general report of results of each quality control task performed by each of the at least one quality control application is generated. The general report is sent to the user.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 4 illustrates a screenshot of an example report generating during a quality on submit process using an appropriate system, such as the system described in FIG. 1;

DETAILED DESCRIPTION

This disclosure generally describes computer systems, software, and computer implemented methods for providing a process for ensuring quality on submission of source code. A generic quality on submit (QOS) engine can be used to analyze changes to source code upon submission of the changes from a developer, perform tests on the submitted changes, detect errors or bugs in the code, report the results of the tests, and provide other services for ensuring the quality of changes to the source code. The QOS engine can be triggered by a source control system after a user submits revisions or updated source code to the source control system. The QOS engine can synchronize a number of tasks, with each task representing different quality activities. In particular, the QOS engine can initiate build processes, deployment of fresh artifacts, or tests of any type, such as unit tests, user interface automation tests, application programming interface (API) tests, or code quality tests. The QOS engine can also generate a summary report to send to the user who submitted the software change.

In some implementations, the QOS engine can be a non-intrusive, end-to-end solution configured for performing a set of tasks to help identify, fix, or report errors in source code early in the development lifecycle or shortly after a software change has been submitted by a developer. The QOS engine can monitor new code in all aspects and provide feedback regarding the likely quality of the submitted changes based on the number and type of errors in the code. Further, the QOS engine can be a fully customizable and extensible engine configured to connect to any product on the market, such as build servers, test technologies, or internal and external processes and tools, for example.

One potential benefit of the QOS engine is that defects in new source code can be detected early in the product development lifecycle. A product development lifecycle can include different phases such as coding, unit testing, function testing, field testing, and post-release. In some instances, the development lifecycle follows a natural order of the phases beginning from coding and continuing through post-release. Generally, a large majority of the total defects are introduced into the source code during the coding phase of the product development lifecycle. Due to inefficiencies in testing methods, however, most of the defects introduced into the source code are not found until later phases. The cost of repairing defects in the later phases of the development lifecycle increases significantly the later the defects are found. Accordingly, the QOS engine can apply testing utilities to new coding changes in the early stages of the development lifecycle, during the initial phases of code development, in order to detect and repair defects with minimal cost. Further, the QOS engine can be configured as a fully customizable and extensible solution to connect to any product, including build servers, test technologies, or source control systems. Accordingly, current software development systems do not need to be modified, restructured, or updated to utilize the features provided by the QOS engine.

Another potential benefit of the QOS engine is the application of quality testing and verification with respect to different aspects of the new source code. Existing quality control applications are available to software developers, but the various quality options may require careful administration by a user, for example. Further, the different quality control options may not be consistently or efficiently applied to a source code change. The QOS engine can efficiently manage various testing and verification methods targeting different aspects of source code quality and provide in-depth reporting of the analysis shortly after a developer submits source code changes. Still further, the reporting functions of the QOS engine can include detailed data regarding source code changes, such as specific data related to individual software developers to help identify problematic areas during software development. The statistical data can be used to grade individual programmers or inform project managers of a current status of each aspect in a project.

Figure 1:
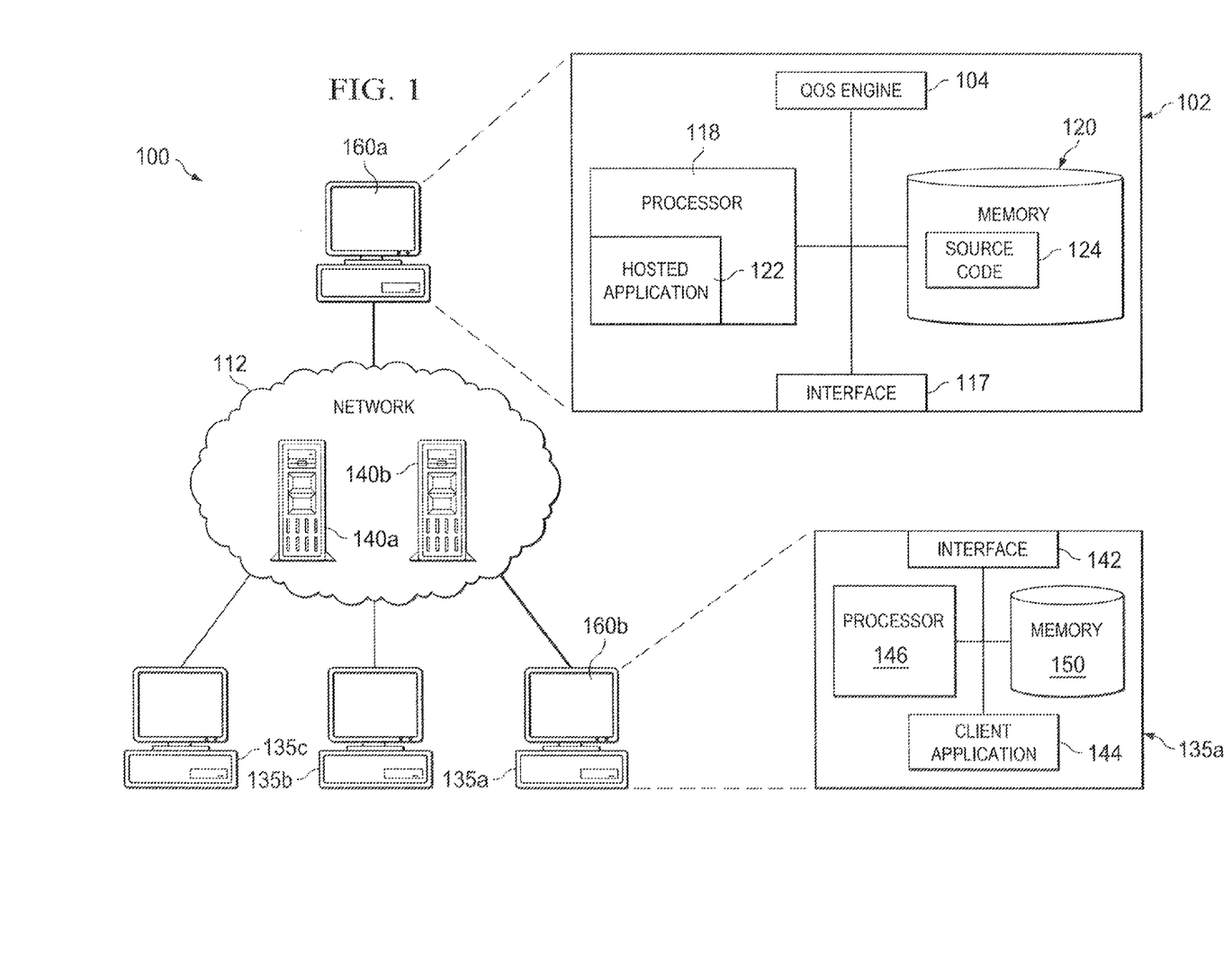
FIG. 1 illustrates an example environment for providing a quality on submit process.

Turning to the illustrated example, FIG. 1 illustrates an example environment 100 for providing a QOS engine 104 for ensuring quality on submission of new source code. The illustrated environment 100 includes or is communicably coupled with one or more clients 135 or servers 102, at least some of which communicate across network 112. In general, environment 100 depicts an example configuration of a system capable of initiating detection and repair of software defects upon submission of new software changes. In some implementations, the QOS engine 104 or logic for ensuring quality of submitted software changes can be implemented as a hosted application on a server, such as server 102, accessible to a user at client 135a through a network 112. In certain instances, clients 135a-b and server 102 can be logically grouped and accessible within a cloud computing network. Accordingly, the QOS engine 104 may be provided as an on-demand solution through the cloud computing network as well as a traditional server-client system or a local application at client 135a. Alternatively, the QOS engine 104 may be provided through a traditional server-client implementation or locally at client 135a without the need for accessing a hosted application through network 112.

In general, server 102 is any server that stores one or more hosted applications 122, where at least a portion of the hosted applications are executed via requests and responses sent to users or clients within and communicably coupled to the illustrated environment 100 of FIG. 1. For example, server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, the server 102 may store a plurality of various hosted applications 122, while in other instances, the server 102 may be a dedicated server meant to store and execute only a single hosted application 122. In some instances, the server 102 may comprise a web server or be communicably coupled with a web server, where the hosted applications 122 represent one or more web-based applications accessed and executed via network 112 by clients 135 of the system to perform the programmed tasks or operations of the hosted application 122.

At a high level, the server 102 comprises an electronic computing device operable to receive, transmit, process, store, or manage data and information associated with the environment 100. The server 102 illustrated in FIG. 1 can be responsible for receiving application requests from one or more client applications or business applications associated with clients 135 of environment 100 and responding to the received requests by processing said requests in the associated hosted application 122, and sending the appropriate response from the hosted application 122 back to the requesting client application. The server 102 may also receive requests and respond to requests from other components on network 112. Alternatively, the hosted application 122 at server 102 can be capable of processing and responding to local requests from a user accessing server 102 locally. Accordingly, in addition to requests from the external clients 135 illustrated in FIG. 1, requests associated with the hosted applications 122 may also be sent from internal users, external or third-party customers, other automated applications, as well as any other appropriate entities, individuals, systems, or computers. Further, the terms "client application" and "business application" may be used interchangeably as appropriate without departing from the scope of this disclosure.

As used in the present disclosure, the term "computer" is intended to encompass any suitable processing device. For example, although FIG. 1 illustrates a single server 102, environment 100 can be implemented using one or more servers 102, as well as computers other than servers, including a server pool. Indeed, server 102 and client 135 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 and client 135 may be adapted to execute any operating system, including Linux, UNIX, Windows, Mac OS, or any other suitable operating system. According to one implementation, server 102 may also include or be communicably coupled with a mail server.

In the present implementation, and as shown in FIG. 1, the server 102 includes a processor 118, an interface 117, a memory 120, and one or more hosted applications 122. The interface 117 is used by the server 102 for communicating with other systems in a client-server or other distributed environment (including within environment 100) connected to the network 112 (e.g., clients 135, as well as other systems communicably coupled to the network 112). Generally, the interface 117 comprises logic encoded in software and/or hardware in a suitable combination and operable to communicate with the network 112. More specifically, the interface 117 may comprise software supporting one or more communication protocols associated with communications such that the network 112 or interface's hardware is operable to communicate physical signals within and outside of the illustrated environment 100.

The server 102 may also include a user interface, such as a graphical user interface (GUI) 160a. The GUI 160a comprises a graphical user interface operable to, for example, allow the user of the server 102 to interface with at least a portion of the platform for any suitable purpose, such as creating, preparing, requesting, or analyzing data, as well as viewing and accessing source documents associated with business transactions. Generally, the GUI 160a provides the particular user with an efficient and user-friendly presentation of business data provided by or communicated within the system. The GUI 160a may comprise a plurality of customizable frames or views having interactive fields, pull-down lists, and buttons operated by the user. For example, GUI 160*a* may provide interactive elements that allow a user to select from a list of suggested entries for input into a data field displayed in GUI 160*a*. More generally, GUI 160*a* may also provide general interactive elements that allow a user to access and utilize various services and functions of application 122. The GUI 160*a* is often configurable, supports a combination of tables and graphs (bar, line, pie, status dials, etc.), and is able to build real-time portals, where tabs are delineated by key characteristics (e.g. site or micro-site). Therefore, the GUI 160*a* contemplates any suitable graphical user interface, such as a combination of a generic web browser, intelligent engine, and command line interface (CLI) that processes information in the platform and efficiently presents the results to the user visually.

Generally, example server 102 may be communicably coupled with a network 112 that facilitates wireless or wireline communications between the components of the environment 100 (i.e., between the server 102 and clients 135), as well as with any other local or remote computer, such as additional clients, servers, or other devices communicably coupled to network 112 but not illustrated in FIG. 1. In the illustrated environment, the network 112 is depicted as a single network in FIG. 1, but may be a continuous or discontinuous network without departing from the scope of this disclosure, so long as at least a portion of the network 112 may facilitate communications between senders and recipients. The network 112 may be all or a portion of an enterprise or secured network, while in another instance at least a portion of the network 112 may represent a connection to the Internet. In some instances, a portion of the network 112 may be a virtual private network (VPN), such as, for example, the connection between the client 135 and the server 102. Further, all or a portion of the network 112 can comprise either a wireline or wireless link. Example wireless links may include 802.11a/b/g/n, 802.20, WiMax, and/or any other appropriate wireless link. In other words, the network 112 encompasses any internal or external network, networks, sub-network, or combination thereof operable to facilitate communications between various computing components inside and outside the illustrated environment 100. The network 112 may communicate, for example, Internet Protocol (IP) packets, Frame Relay frames, Asynchronous Transfer Mode (ATM) cells, voice, video, data, and other suitable information between network addresses. The network 112 may also include one or more local area networks (LANs), radio access networks (RANs), metropolitan area networks (MANs), wide area networks (WANs), all or a portion of the Internet, and/or any other communication system or systems at one or more locations. The network 112, however, is not a required component of the present disclosure, and the elements hosted by the server 102, such as the QOS engine 104, may be implemented locally at a client 135 or locally at server 102.

Clients 135*a-b* may have access to resources such as server 102 within network 112. In certain implementations, the servers within the network 112, including server 102 in some instances, may comprise a cloud computing platform for providing cloud-based services. The terms "cloud," "cloud computing," and "cloud-based" may be used interchangeably as appropriate without departing from the scope of this disclosure. Cloud-based services can be hosted services that are provided by servers and delivered across a network to a client platform to enhance, supplement, or replace applications executed locally on a client computer. Clients 135*a-b* can use cloud-based services to quickly receive software upgrades, applications, and other resources that would otherwise require a lengthy period of time before the resources can be delivered to the clients 135*a-b*. Additionally, other devices may also have access to cloud-based services, such as on-demand services provided by servers accessible through network 112.

As described in the present disclosure, on-demand services can include multiple types of services such as products, actionable analytics, enterprise portals, managed web content, composite applications, or capabilities for creating, integrating, using and presenting business applications. For example, a cloud-based implementation can allow client 135 to transparently upgrade from an older user interface platform to newer releases of the platform without loss of functionality. In certain implementations, during development phases of a software application, users or software developers can submit software changes in connection with a quality on submit (QOS) service to ensure early detection and repair of software defects. The QOS service can analyze changes to source code upon submission of the changes from a developer, perform tests on the submitted changes, detect errors or bugs in the code, report the results of the tests, and provide other services for ensuring the quality of changes to the source code.

As illustrated in FIG. 1, server 102 includes a processor 118. Although illustrated as a single processor 118 in FIG. 1, two or more processors may be used according to particular needs, desires, or particular embodiments of environment 100. Each processor 118 may be a central processing unit (CPU), a blade, an application specific integrated circuit (ASIC), a field-programmable gate array (FPGA), or another suitable component. Generally, the processor 118 executes instructions and manipulates data to perform the operations of server 102 and, specifically, the one or more plurality of hosted applications 122. Specifically, the server's processor 118 executes the functionality required to receive and respond to requests from the clients 135*a-b* and their respective client applications 144, as well as the functionality required to perform the other operations of the hosted application 122.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 118 executes one or more hosted applications 122 on the server 102.

At a high level, each of the one or more hosted applications 122 is any application, program, module, process, or other software that may execute, change, delete, generate, or otherwise manage information according to the present disclosure, particularly in response to and in connection with one or more requests received from the illustrated clients 135*a-b* and their associated client applications 144 or from other servers or components through a network 112. In certain cases, only one hosted application 122 may be located at a particular server 102. In others, a plurality of related and/or unrelated hosted applications 122 may be stored at a single server 102, or located across a plurality of other servers 102, as well. In certain cases, environment 100 may implement a composite hosted application 122. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others.

Additionally, the hosted applications 122 may represent web-based applications accessed and executed by remote clients 135a-b or client applications 144 via the network 112 (e.g., through the Internet). Further, while illustrated as internal to server 102, one or more processes associated with a particular hosted application 122 may be stored, referenced, or executed remotely. For example, a portion of a particular hosted application 122 may be a web service associated with the application that is remotely called, while another portion of the hosted application 122 may be an interface object or agent bundled for processing at a remote client 135. Moreover, any or all of the hosted applications 122 may be a child or sub-module of another software module or enterprise application (not illustrated) without departing from the scope of this disclosure. Still further, portions of the hosted application 122 may be executed by a user working directly at server 102, as well as remotely at client 135.

As illustrated, processor 118 can also execute a QOS engine 104 that provides services for applications such as hosted application 122, client application 144, or clients 135 within network 112. The QOS engine 104 is a software application implemented using any appropriate software language or framework, including Java or the .NET framework, for example. In some implementations, the QOS engine 104 can be executed by a different processor or server external to server 102, such as by a server communicably coupled to server 102 through network 112. For example, the QOS service provided by the QOS engine 104 may be provided as an on-demand service through a cloud computing network, as a web service accessible via network 112, or as a service provided on a dedicated and/or on-premise server. The QOS engine 104 can provide interfaces, modules, services, or metadata definitions that enable hosted application 122 or client application 144 to provide detection and repair of software defects in source code changes submitted by a developer early in a development lifecycle.

In some implementations, the QOS engine 104 is implemented in connection with a source control system. Source control systems are applications configured to manage changes made to documents, programs, and other information stored as computer files, and are frequently used in software development when multiple software developers are working on the same files and source code. A source control application can be implemented as a hosted application, such as hosted application 122, or as embedded software in other types of software such as word processors, spreadsheet applications, or other content management systems. Software developers can use a source control application to track source code editing from other developers, correct mistakes, and easily revert to previous versions of source code in the case of a defect or failure. Examples of source control systems can include existing applications such as Perforce, SVN, ClearCase, and other applications. In some instances, the QOS engine 104 can be used with existing source control systems without additional modification of the source control applications.

The QOS engine 104 may provide services for analyzing changes to source code upon submission of the changes from a developer, perform tests on the submitted changes, detect errors or bugs in the code, report the results of the tests, and provide other services for ensuring the quality of changes to the source code. For example, a user can submit new source code or a revision of source code in a change list to a source control application. The source control application can then trigger the QOS engine 104 to initiate and manage a set of tasks to ensure quality of the submitted source code changes. Alternatively, the QOS engine 104 can be configured to detect new submissions to the source control system and automatically initiate quality control tasks.

The quality control tasks managed by the QOS engine 104 can include, among others, build processes, deployment of fresh artifacts, tests for source code defects, and generation of source code reports. Examples of tests performed on the source code can include unit tests, user interface activation tests, smoke tests, and the like. The tests invoked by the QOS engine 104 can include any commercial or open source quality or software lifecycle applications that can be automatically triggered via a command line or other automation interface. Further, each testing process can store the testing results in an XML file as an individual report in some instances, and the QOS engine 104 can receive, process, and assimilate the results contained in each of the reports and generate an overall report indicating the status of the various tests performed on the source code. Accordingly, the QOS engine 104 can be compatible with a number of quality control applications.

In general, the server 102 also includes memory 120 for storing data and program instructions. Memory 120 may include any memory or database module and may take the form of volatile or non-volatile memory including, without limitation, magnetic media, optical media, random access memory (RAM), read-only memory (ROM), removable media, or any other suitable local or remote memory component. Memory 120 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 122.

Memory 120 can also store data objects such as source code 124. The source code 124 can be computer files or programming instructions associated with a particular computer application. In some implementations, the source code 124 can be under revision or development, and multiple users can access the same source code files to make changes or add new source code. Source control systems can access the source code 124 to manage the different changes and versions of the source code 124 throughout the software development process.

The illustrated environment of FIG. 1 also includes one or more clients 135. Each client 135 may be any computing device operable to connect to or communicate with at least the server 102 and/or via the network 112 using a wireline or wireless connection. Further, as illustrated in FIG. 1, client 135a includes a processor 146, an interface 142, a graphical user interface (GUI) 160b, a client application 144, and a memory 150. In general, client 135a comprises an electronic computer device operable to receive, transmit, process, and store any appropriate data associated with the environment 100 of FIG. 1. It will be understood that there may be any number of clients 135 associated with, or external to, environment 100. For example, while illustrated environment 100 includes client 135*a*, alternative implementations of environment 100 may include multiple clients communicably coupled to the server 102, or any other number of clients suitable to the purposes of the environment 100. Additionally, there may also be one or more additional clients 135 external to the illustrated portion of environment 100 that are capable of interacting with the environment 100 via the network 112. Further, the term "client" and "user" may be used interchangeably as appropriate without departing from the scope of this disclosure. The term "client" may also refer to any computer, application, or device, such as a mobile device, that is communicably coupled to one or more servers through a network 112. Moreover, while each client 135 is described in terms of being used by a single user, this disclosure contemplates that many users may use one computer, or that one user may use multiple computers.

The GUI 160*b* associated with client 135*a* comprises a graphical user interface operable to, for example, allow the user of client 135*a* to interface with at least a portion of the platform for any suitable purpose, such as creating, preparing, requesting, or analyzing data, as well as viewing and accessing source documents associated with business transactions. Generally, the GUI 160*b* provides the particular user with an efficient and user-friendly presentation of business data provided by or communicated within the system. The GUI 160*b* may comprise a plurality of customizable frames or views having interactive fields, pull-down lists, and buttons operated by the user. In particular, GUI 160*b* may display a visual representation of work items 154 to a user and present a visual indicator of the relative importance of the work items 154 based on a particular business context of the user. More generally, GUI 160*b* may also provide general interactive elements that allow a user to access and utilize various services and functions of application 144. The GUI 160*b* is often configurable, supports a combination of tables and graphs (bar, line, pie, status dials, etc.), and is able to build real-time portals, where tabs are delineated by key characteristics (e.g. site or micro-site). Therefore, the GUI 160*b* contemplates any suitable graphical user interface, such as a combination of a generic web browser, intelligent engine, and command line interface (CLI) that processes information in the platform and efficiently presents the results to the user visually.

As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may comprise a computer that includes an input device, such as a keypad, touch screen, mouse, or other device that can accept user information, and an output device that conveys information associated with the operation of the server 102 (and hosted application 122) or the client 135 itself, including digital data, visual information, the client application 144, or the GUI 160*b*. Both the input and output device may include fixed or removable storage media such as a magnetic storage media, CD-ROM, or other suitable media to both receive input from and provide output to users of client 135 through the display, namely, the GUI 160*b*.

While FIG. 1 is described as containing or being associated with a plurality of elements, not all elements illustrated within environment 100 of FIG. 1 may be utilized in each alternative implementation of the present disclosure. For example, although FIG. 1 depicts a server-client environment implementing a hosted application at server 102 that can be accessed by client computer 135, in some implementations, server 102 executes a local application that features an application UI accessible to a user directly utilizing GUI 160*a*. Further, although FIG. 1 depicts a server 102 external to network 112, server 102 may be included within the network 112 as part of an on-demand context solution, for example. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2A:
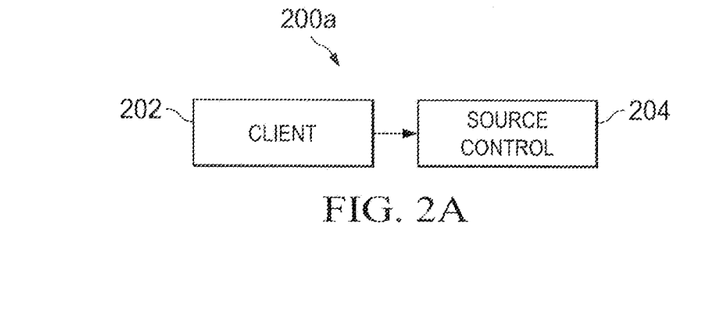
FIGS. 2A-B illustrate diagrams of example components for providing a quality on submit process using an appropriate system, such as the system described in FIG. 1.

FIGS. 2A-B illustrate example diagrams 200*a* and 200*b* of some of the components used during the quality on submit process. In FIG. 2A, client 202 can be any client computer associated with a software developer, including a personal computer, laptop, mobile device, tablet, or other computing device as described above in connection with client 135*a*. In the illustrated example, client 202 is the machine on which source code is developed by a software developer. In some implementations, client 202 can include the tools necessary for software development, including an integrated development environment, source code editors, compilers, build automation tools, debuggers, and other software development tools. Further, although a single client 202 is depicted in FIG. 2A, a plurality of clients can be used in connection with the quality on submit process represented in FIG. 2A, each of the clients associated with different software developers accessing and revising the same source code.

When the software developer has completed the new code, client 202 can submit the new code to a source control system 204. Source control 204 can include an application used for managing revisions in a software development project. In some implementations, the source control system 204 also provides a file system and database host for all files and revisions associated with the software development project. Multiple clients may make changes to the software, and the same source code files may be checked out or checked in to the source control system 204 at different times. Accordingly, the source control system 204 manages and coordinates the various source code changes from different clients. The source control system 204 can be distributed across multiple servers or clients, including at clients operated by the software developers, hosted on a dedicated system, or at a server in communicable connection with other applications at the server.

Figure 2B:
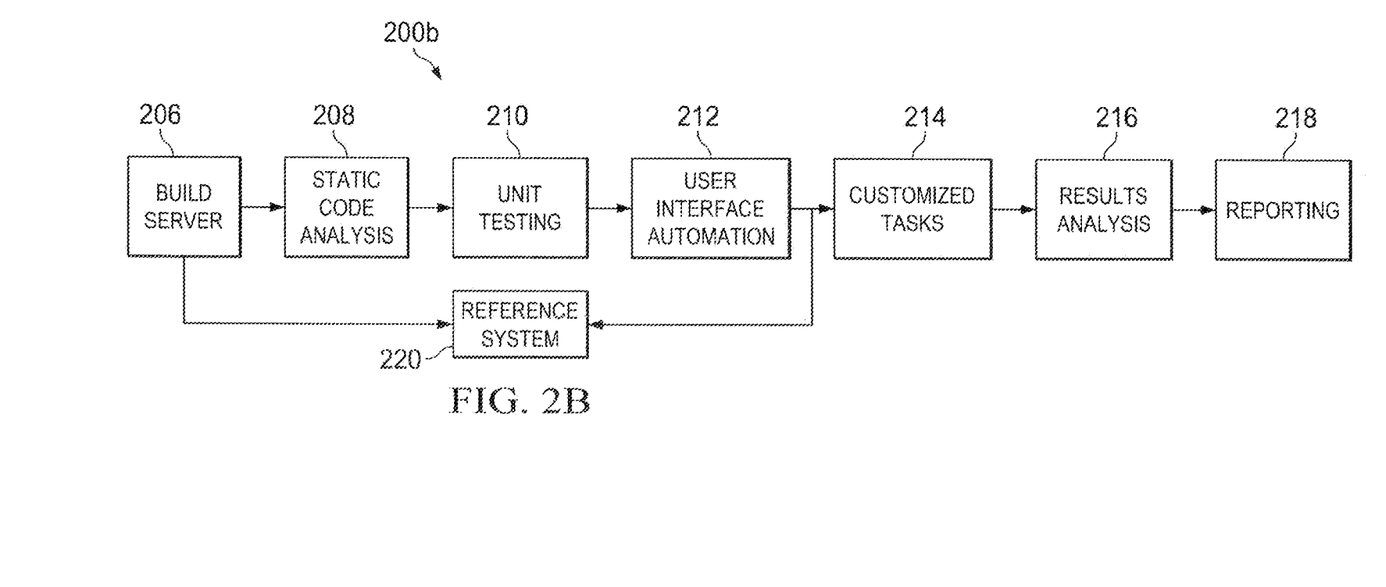

After receiving new code from client 202, source control 204 can initiate a quality on submit process by invoking the QOS engine 104. In some implementations, the QOS engine 104 listens to changes to the source code received at the source control system 204. When the QOS engine 104 identifies new submissions of source code at the source control system 204, the QOS engine 104 synchronizes and activates a set of dependent/independent automated quality activities to test and verify different aspects of software quality, as illustrated in FIG. 2B. In some implementations, the QOS engine 104 initiates the automated quality activities immediately after the new source code is received at the source control system 204, or within a relatively short time period thereafter. In certain instances, source control system 204 may not be configured to initiate the quality activities, coordinate with various quality control systems, or generate quality reports on the source code submissions. Accordingly, the automated quality activities are generally not performed on source code submissions until later in the software development lifecycle. The QOS engine 104, however, allows source code submissions to be analyzed shortly after the source code is received at the source control system 204. As a result, software developers can receive reports indicating possible defects in the code changes and a relative quality of the source code submission before the cost to repair the defects in the source code increases drastically in later stages of development of the software.

The QOS engine 104 can activate existing quality control systems, applications, or services without requiring modifications to the existing quality control functions. In other words, the QOS engine 104 can be implemented as a non-intrusive, end-to-end engine coupled with existing quality activities for ensuring quality of source code submissions without restructuring the existing quality activities. As illustrated in FIG. 2, each of the quality activities is represented as a logical component that can be extended, customized, or changed according to project needs. The components for each quality activity can include hardware as well as software applications used to implement the individual quality activities. Further, although illustrated as separate components, the quality activities can also include applications that are executed by the same processor or on the same server. Still further, although the quality activities are performed in a particular order in the illustrated example, all or some of the quality activities can also be triggered in parallel and/or asynchronously.

In certain implementations, the quality activities initiated by the QOS engine 104 begins with sending the source code to a build server 206 for building and compiling artifacts from the source code. The artifacts can include byproducts created during software development, such as source code or executables created to test or validate the software code, or specific development methods or processes. If the build performed on the source code changes is successful, the source code is deployed on a local reference system 220, which contains the most up-to-date versions of the source code.

After the build process at the build server 206, static code analysis 208 can then be performed on the software code changes. Static code analysis 208 can include analyzing source code to calculate and provide quality measures of the analyzed code, for example. In some instances, static code analysis 208 comprises a process of scanning source code as a text file and identifying potentially problematic segments of source code. Sections of code flagged as potentially problematic can include commonly used algorithms, objects, phrases or code patterns that, from best practices or collective programming experience, are regarded as errors or inefficient, unnecessarily complex, or suspect. In some implementations, static code analysis 208 can rank portions of the source code based on a level of complexity, efficiency, or other performance-related metric.

Further, unit testing 210 can be performed on the source code for further testing. In some implementations, unit testing 210 includes automated procedures at the code level to test different components in the source code in isolation. The source of the defects in the source code can be easily identified through unit testing 210. Unit testing can involve implementing tests developed in the same language and technology as the source code to be tested. Units of code can be tested during the unit testing process to determine whether the value returned by the unit is the expected result given a set of inputs.

Still further, user interface (UI) automation testing 212 can be performed on submitted source code changes. In general, UI automation testing 212 can involve automated procedures for simulating end-user scenarios at the GUI level of the software. Any user interactions and experiences can be simulated and automatically tested using the UI automation testing 212 functions, including using scripting languages for specifying testing procedures and manipulating objects and controls in the user interface for testing scenarios. In situations when UI automation testing 212 needs to be performed within a short amount of time, or where otherwise useful, a sub-test of the UI automation testing process 212 can be used to test the source code. In some implementations, new code can be transmitted to a reference system 220. The reference system 220 can store newly deployed code after the build process at build server 206 or after UI automation testing 212. Customized tasks 214 can also be performed on the source code. The customized tasks 214 include any other quality activity that can be added to the quality on submit process according to the needs of a particular project or software code change. In other words, the process initiated by the QOS engine 104 is extensible to include additional tasks as necessary for the particular software under development.

After the quality tasks are performed, the source code data can be saved to a database (or other suitable repository) and exposed to users through a UI tool. Further, results from the various quality tests can be aggregated and analyzed at 216. In certain implementations, test results from the different quality tests may indicate only basic details regarding the tests performed on the source code. For example, test results received from the various tests may indicate only whether the source code passed or failed a particular test. A result analysis process can be performed to further analyze the test results in order to provide meaningful feedback to a software developer. An example implementation of the results analysis process is described below in connection with FIG. 6. For example, the test results can be analyzed to provide feedback on what type of implications a particular software change has on a product. Some software changes can be analyzed for standards compliance. In some instances, accessibility compliance standards may apply to a particular application, and a submitted software change, such as removing or adding tooltips for icons, may affect the application's level of compliance with respect to the accessibility compliance standards.

For example, removal of tooltips for a particular icon may not affect the functionality of an application as a whole, and the test results may not indicate a defect in the new source code. The results analysis process, however, may be able to determine that removal of the tooltips would adversely affect compliance with accessibility standards. Accordingly, in some instances, the results analysis can provide meaningful feedback to users in situations when merely presenting test results fails to provide feedback related to product standards.

In certain implementations, root cause analysis can also be performed on test results. Root cause analysis can include identifying and documenting hotspots in a product and determining the reasons the product is not performing well or meeting a particular standard or metric. Further, the analysis can involve identifying the reasons behind certain problems at different levels of granularity. For example, the root cause analysis can determine that a root cause of a problem is due to a specific change that was introduced at a given point in time, or, for example, that the best way to improve globalization of a product is to invest in a given component of the product. Analysis of the test results can include pattern analysis, for example. During software development, certain patterns of development successes or failures can be tracked and documented. In some implementations, the pattern analysis can identify repetitive problems with respect to various factors involved in the software development process, such as problems associated with a particular employee, computing device, or time of day or week.

Accordingly, analysis of the results retrieved from various tests can be used to determine the implications of changes introduced to source code with respect to a number of different product standards. The analysis process can provide feedback regarding the effect of source code changes on product standards including, for example, accessibility, application integration and interfaces, functional correctness, globalization, information lifecycle management, information technology (IT) service and application management, open source and third party usage, performance, security and data privacy and protection, technical implementation and change management, and usability.

The analysis of the test results can be included in a report at a reporting component 218. In some instances, each of the quality testing processes can generate individual reports and save the test results in an XML file (or other suitable file type) as a report. The QOS engine 104 receives the individual reports from the different quality test processes, parses the results, translates the results into a format suitable for communication to a user, and triggers calculation of the current status of the submitted source code change. For example, different variables or quality metrics can be weighted differently in the final analysis of the source code, and various methods can be used to determine an overall report on the quality of the source code.

The report of the quality analysis and test results can be included as a final report in an e-mail or other form for communication to the software developers, development team, and managers. Data from the reports and analysis can also be saved in an archive for future monitoring. For example, the statistics of individual software developers can be tracked by the reporting component 218, including the frequency, severity, timing, or specific dates of defects introduced into the source code by individual developers. The reports regarding the software changes can be used to grade a developer's coding skills using concrete data and identify areas in which a particular developer may be introducing defects. In some instances, reporting component 218 can comprise functionality provided by the QOS engine 104 or other components within the quality on submit system. The reporting functionality of the QOS engine 104 allows users to receive immediate feedback regarding source code submissions. In some implementations, the QOS engine 104 can provide feedback regarding quality of the source code submission in less than 6.5 minutes from submission of the new source code.

Figure 3:
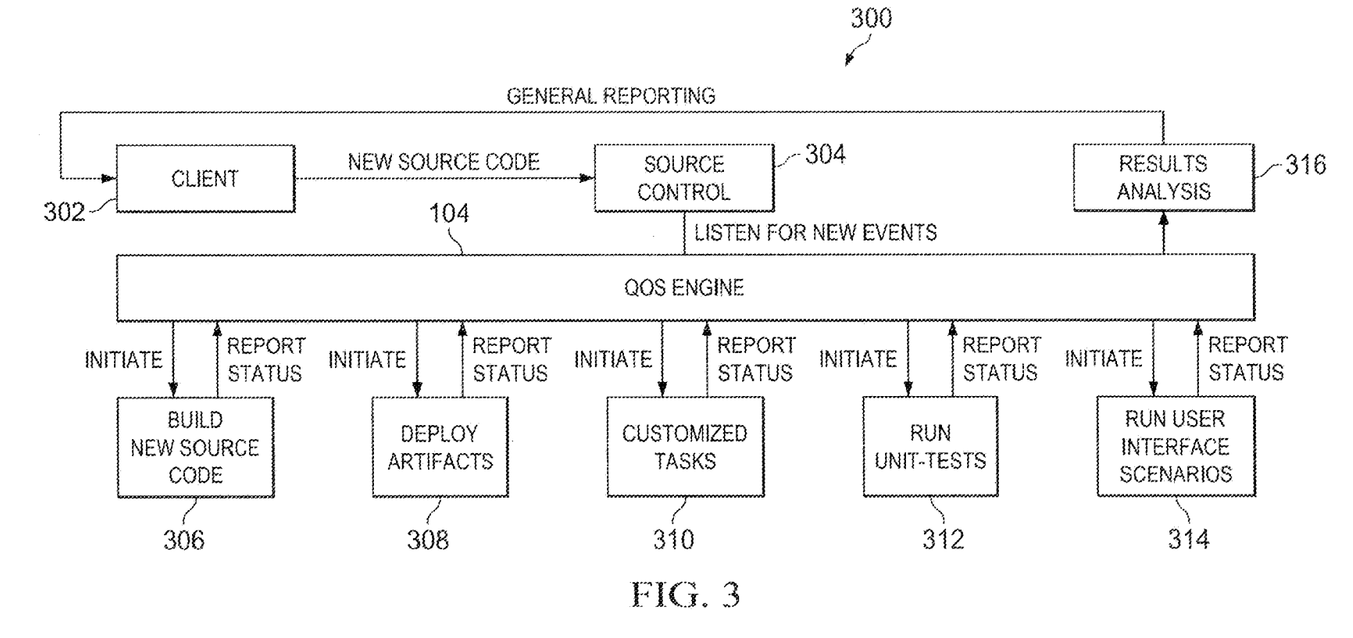
FIG. 3 illustrates another diagram of example components for providing a quality on submit process using an appropriate system, such as the system described in FIG. 1.

FIG. 3 depicts another diagram 300 of the logical components that can be used during a quality on submit process and the example interactions between testing applications and the QOS engine 104. As seen in FIG. 3, the QOS engine 104 can have access to a source control system 304 as well as different testing functions. The QOS engine 104 first listens to any new source code events at the source control system 304, such as submission of new code from a client 302. After new code is received at the source control system 304, the QOS engine 104 can retrieve the new code and begin a process for identifying defects and determining the quality of the new code. In some implementations, the QOS engine 104 can initiate one or more applications or systems to perform various quality control tasks with respect to the new code. For example, the QOS engine 104 can call a build server to initiate a build on the new source 306.

As seen in FIG. 3, other components can also be initiated by the QOS engine 104 during the quality control process. Testing applications or systems can be initiated by the QOS engine 104 to deploy artifacts 308, perform customized tasks 310, run unit tests 312, or run user interface (UI) scenarios 314. As described above in connection with FIG. 2, each of the tests can relate to a different aspect of the source code and provide an indication of the relative quality of the source code based on different criteria. The tests can include standard commercial or open source testing software with appropriate interfaces to allow the QOS engine 104 to communicate with the testing software. Although the tests in FIG. 3 are depicted in a particular arrangement, the QOS engine 104 can initiate the tests in a different order depending on the context. Further, in some implementations, the tests and steps depicted in FIG. 3 can be triggered in parallel and/or asynchronously.

Also, the QOS engine 104 can terminate the quality control process without initiating all the tests depicted, depending on the specific requirements of the project at issue. For example, the quality parameters of a particular software project may have strict requirements with respect to certain tests. In some instances, the requirements of the software application demand a minimum standard or do not permit more than a certain number of defects for a particular test. Accordingly, the QOS engine 104 may not initiate other tests after it is determined that the number of defects found during a particular test exceeds the maximum allowed defects. In other words, the QOS engine 104 provides efficient management, coordination, and utilization of the various available testing procedures in order to determine an indicator of relative quality of newly submitted source code changes suited for a specific project or software developer.

Further, the results of each of the testing procedures can be stored as individual reports presented in different computer files. The QOS engine 104 obtains the report status contained in the computer files from each of the testing components. In some implementations, the QOS engine 104 is configured to parse the reports and generate a separate report that incorporates results from each of the individual tests into a general summary of the quality measurements of the new source code. Further, the results of the testing procedures can be included in a results analysis process 316 before the general report is generated. The results analysis process 316 can include further analyzing the test results in order to provide meaningful feedback to include in the final report sent to the client 302. As described above in connection with FIG. 2, examples of the analysis performed can include, among others, standards compliance analysis, root cause analysis, and/or pattern analysis. Feedback from the results analysis and data from the testing procedures can then be included in a final report and sent to the client 302.

FIG. 4 depicts an example screenshot 400 of a report generated by the QOS engine 104 indicating the results of various tests performed on different source code submissions. As seen in FIG. 4, a report generated by the QOS engine 104 can include a date/time the new source code was submitted, the project associated with the source code, the particular user that submitted the source code, the particular change identification, and the different tests that were performed on the source code and the results of the tests.

Figure 5:
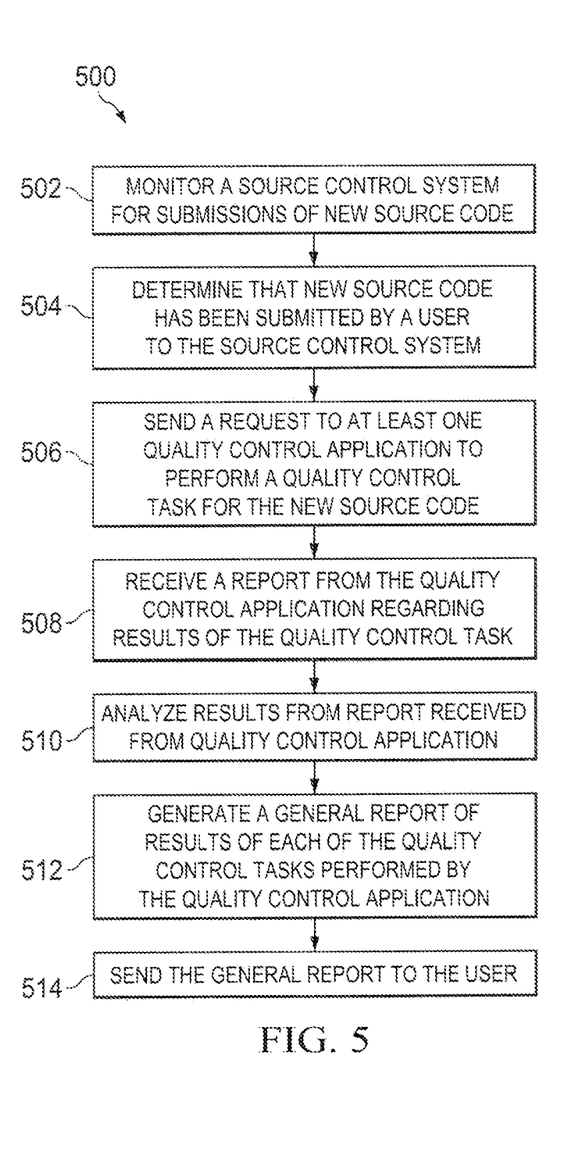
FIG. 5 is a flowchart of the quality on submit process using an appropriate system, such as the system described in FIG. 1.

FIG. 5 depicts an example flowchart of a quality on submit process 500. The QOS engine 104 monitors a source control system for submissions of new source code at 502. Accordingly, the QOS engine 104 can determine when new source code has been submitted by a user to the source control system at 504. After the QOS engine 104 identifies the new source code submission, a request can be sent to at least one quality control application to perform a quality control task for the new source code at 506. As discussed above in connection with FIGS. 2 and 3, quality control tasks can include building the new source code, performing static code analysis on the new source code, performing unit tests on the new source code, performing a user interface automation test on the new source code, or other available testing methods.

In some implementations, the QOS engine 104 identifies a plurality of quality control applications to send requests to and determines a sequential (or concurrent) order in which the requests are to be sent. Further, the QOS engine 104 can determine when to cancel certain requests based on results of quality control tasks associated with previous requests. For example, the new source code may be associated with a project requiring no software defects when a certain test is performed. If the test returns one or more defects, there would be no need for the QOS engine 104 to request additional tests to be performed. A report could immediately be sent to the user indicating failure of the specific test.

A report of the results of the quality control task is received from the quality control application at 508. In some instances, the report can include an XML file indicating whether a test has succeeded, a number of defects found in the new source code, or other metric used to determine source code quality. The QOS engine 104 can receive multiple reports from multiple sources to determine quality of the new source code with respect to different aspects. In some implementations, the report received from the quality control application can be further analyzed at 510 to generate meaningful feedback to include in a general report for the user. For example, the report received from the quality control application may only indicate whether a test was passed or failed. The analysis of the test result at 510 can include determining the root cause of a particular defect, patterns of defects, or other analysis of test results.

Figure 6:
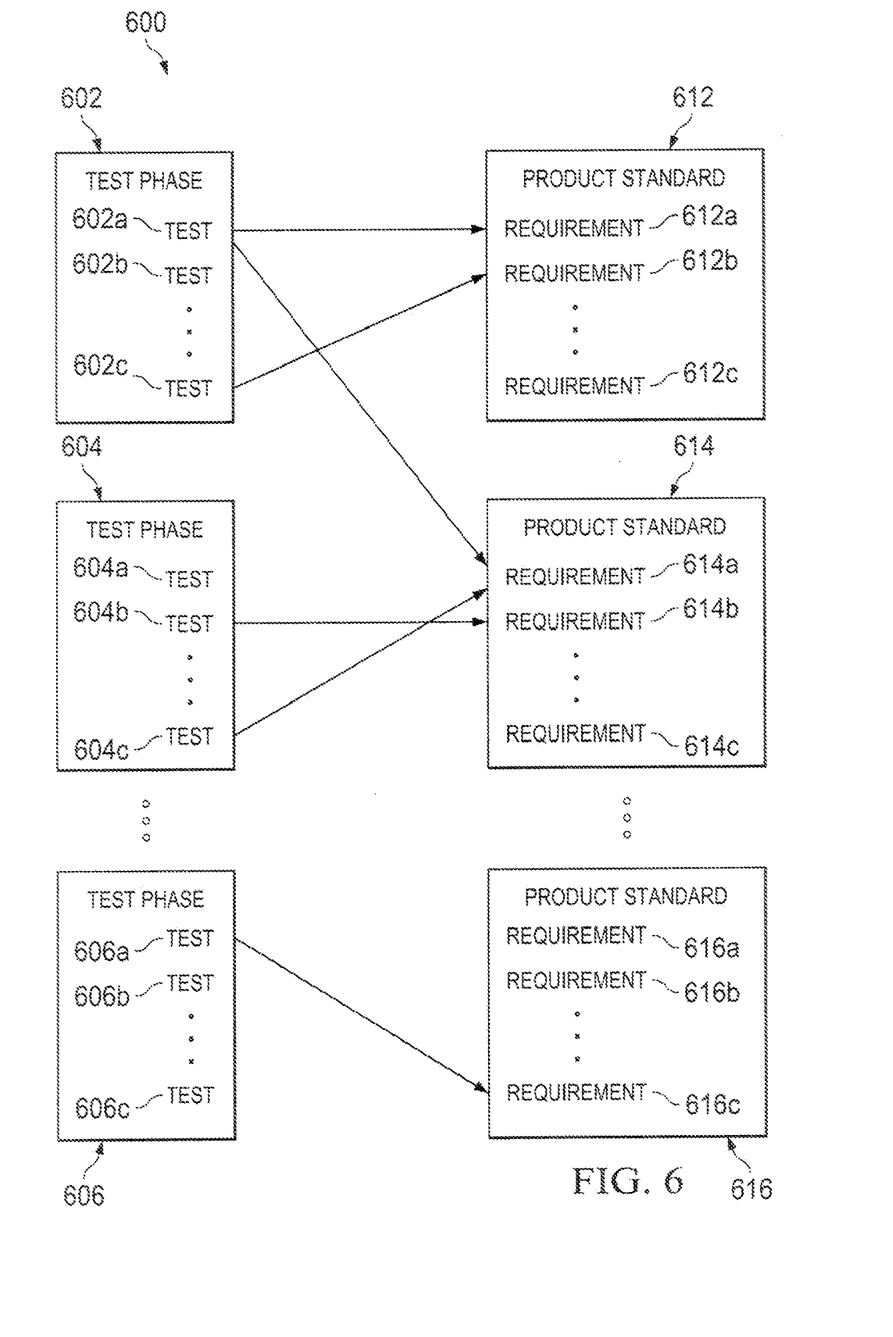
FIG. 6 illustrates a diagram of the analysis of test results during the quality on submit process using an appropriate system, such as the system described in FIG. 1.

FIG. 6 illustrates an example process 600 for analyzing test results. As seen in FIG. 6, a quality control process can include different test phases, including test phases 602, 604, and 606, with each test phase associated with one or more tests. As described above, examples of test phases can include unit testing, UI automation testing, static code analysis, and other applicable tests. Within each of the test phases, multiple tests can be performed. For example, in test phase 602, a plurality of tests can be performed, including tests 602a, 602b, and 602c. The tests in each phase can be tests that are applied to the source code submission to evaluate particular elements or features of a particular test phase. For example, each of the tests performed in the UI automation testing phase can be tests related to generating automatic UI activities to evaluate the source code submission. Each of the tests in the test phases can generate results reflecting evaluation of various aspects of a source code submission.

Further, during the test analysis process, a number of standards requirements are identified, such as requirements 612a, 612b, 612c, and so on. In some instances, the standards requirements are known requirements associated with different product standards, such as product standards 612, 614, and 616. As described above, examples of product standards can include, among others, accessibility, globalization, and security standards, and each product standard can be associated with a number of requirements. Accordingly, the standards requirements can be divided into groups, such as including requirements 612a, 612b, and 612c with product standard 612. In some instances, each product standard can be associated with a particular set of standards requirements.

Further, compliance with some of the standards requirements can be determined based on test results generated by the various tests in the test phases. Accordingly, the test results generated by the various tests can be mapped to one or more standards requirements. In the illustrated example, the results of test 602a are mapped to requirements 612a and 614a, the results of test 602c are mapped to requirement 612b, the results of test 604b are mapped to requirement 614b, the results of test 604c are mapped to requirement 614a, and the results of test 606a are mapped to requirement 616c. Based on the mapping, the test analysis process can determine a level of compliance with different product standards 612, 614, and 616. For example, the percentage of requirements in each product standard group that are satisfied can be determined from the number of successful test results mapped to each requirement. In some implementations, different algorithms can be used to determine the level of compliance for each product standard, such as applying different weights to different requirements or test results.

Returning to the example process illustrated in FIG. 5, the results from the reports and analysis are then aggregated into one general report, and a general report with results of each of the quality control tasks performed by the quality control applications is generated at 512 and sent to the user at 514. The general report can include feedback generated from analysis of the report received from the quality control application. In some implementations, the general report can indicate whether specific tests were passed or failed as well as include an indicator of a relative quality level of the new source code. For example, the indicator can be a numerical value determined based at least in part on a number of defects found in the new source code, a level of complexity of the new source code, or results of the analysis performed on the report received from the quality control application.

In some implementations, the test results and reports can be stored and maintained for statistical analysis, for example. Statistical data can be maintained in terms of users associated with a defect found in submitted source code, dates associated with defects, frequency of defects, types of defects, severity of defects, or sections of the new source code associated with defects. Accordingly, data from the reports can be used to inform developers and project managers of the current status of source code as well as provide concrete data regarding programming performance of individual software developers.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. For example, although some of the preceding description illustrates examples involving a source code submission from a single user, implementations involving source code submissions from a group of users are also within the scope of the present disclosure. In addition, many of the steps in these processes may take place simultaneously and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method performed by one or more processors for providing a quality on submit process, the method comprising the following operations:

monitoring a source control system for submissions of new source code;

determining that new source code has been submitted by a user to the source control system;

identifying a plurality of different quality control applications to perform different quality control tasks;

sending a request to each quality control application to perform a quality control task for the new source code, wherein each quality control application includes a plurality of test phases, each test phase associated with one or more tests to be applied to the new source code;

identifying a plurality of standards requirements, each standards requirement associated with a respective product standard;

receiving a plurality of reports, each report received from each quality control application regarding results of the quality control task performed by each quality control application in response to the request, wherein each report includes a plurality of test results generated at each test phase included in each quality control application;

determining a level of compliance of the new source code with the identified plurality of standards requirements based, at least in part, on the plurality of test results included in the plurality of reports, generating a general report from the plurality of reports, wherein the general report is based on results of each quality control task performed by each of the plurality of quality control applications; and sending the general report to the user.

2. The method of claim 1, wherein the results of the quality control task include a number of defects found in the new source code.

3. The method of claim 1, wherein the quality control task includes at least one of building the new source code, performing a static code analysis on the new source code, performing a unit test on the new source code, or performing a user interface automation test on the new source code.

4. The method of claim 1, wherein sending the request to each quality control application comprises:

determining a particular order for sending requests to the quality control applications to perform the different quality control tasks; and sending the requests to the plurality of quality control applications based on the particular order.

5. The method of claim 4, wherein the requests are sent to the plurality of quality control applications sequentially in the particular order, each request sent after receiving the report from a quality control application previously requested for performing a quality control task.

6. The method of claim 5, wherein subsequent requests to be sent in the particular order are canceled if a particular report received from a quality control application indicates a quality level below a certain threshold.

7. The method of claim 1, further comprising maintaining statistical data based on the results of each quality control task performed.

8. The method of claim 7, the statistical data including data arranged by at least one of a user associated with a defect found in submitted source code, dates associated with defects, frequency of defects, types of defects, severity of defects, or sections of the new source code associated with defects.

9. The method of claim 1, wherein generating the general report includes determining a value representing a relative quality level of the new source code, the value determined based at least in part on a number of defects found in the new source code, a level of complexity of the new source code, or an analysis of the report received from the quality control application.

10. The method of claim 1, wherein generating the general report includes analyzing an effect of the new source code on at least one product standard of a product associated with the new source code.

11. The method of claim 10, wherein analyzing the effect of the new source code comprises:

mapping a result from a particular quality control task to a requirement of the at least one product standard; and determining a level of compliance with the at least one product standard based on the mapping of the result from the particular quality control task to the requirement of the at least one product standard.

12. The method of claim 10, wherein the at least one product standard includes at least one of accessibility, application integration and interfaces, functional correctness, globalization, information lifecycle management, information technology (IT) service and application management, open source and third party usage, performance, security and data privacy and protection, technical implementation and change management, or usability.

13. A non-transitory computer-readable medium storing computer readable instructions for causing one or more processors to perform operations comprising:

monitoring a source control system for submissions of new source code;

determining that new source code has been submitted by a user to the source control system;

identifying a plurality of different quality control applications to perform different quality control tasks;

sending a request to each quality control application to perform a quality control task for the new source code;

receiving a plurality of reports, each report received from each quality control application regarding results of the quality control task performed by each quality control application in response to the request;

determining an effect of the new source code on a product standard of a product associated with the new source code;

generating a general report from the plurality of reports, wherein the general report is based on results of each quality control task performed by each of the plurality of quality control applications, wherein the general report includes the effect of the new source code on the product standard; and sending the general report to the user.

14. The medium of claim 13, wherein the quality control task includes at least one of building the new source code, performing a static code analysis on the new source code, performing a unit test on the new source code, or performing a user interface automation test on the new source code.

15. The medium of claim 13, wherein the product standard includes at least one of accessibility, application integration and interfaces, functional correctness, globalization, information lifecycle management, information technology (IT) service and application management, open source and third party usage, performance, security and data privacy and protection, technical implementation and change management, or usability.

16. The medium of claim 13, wherein generating the general report includes determining a value representing a relative quality level of the new source code, the value determined based at least in part on a number of defects found in the new source code, a level of complexity of the new source code, or an analysis of the report received from the quality control application.

17. A system, comprising:
  memory operable to store reports generated by quality control applications; and
  one or more processors operable to:
    monitor a source control system for submissions of new source code;
    determine that new source code has been submitted by a user to the source control system;
    identify a plurality of different quality control applications to perform different quality control tasks;
    determine a particular order for sending requests to the plurality of quality control applications to perform the different quality control tasks;
    send a request to each quality control application to perform a quality control task for the new source code according to the order;
    receive a plurality of reports, each report received from each quality control application regarding results of the quality control task performed by each quality control application in response to the request;
    generate a general report from the plurality of reports, wherein the general report is based on results of each quality control task performed by each of the plurality of quality control applications; and
    send the general report to the user.

18. The system of claim 17, wherein the results of the quality control task include a number of defects found in the new source code.

19. The system of claim 17, wherein the quality control task includes at least one of building the new source code, performing a static code analysis on the new source code, performing a unit test on the new source code, or performing a user interface automation test on the new source code.

20. The system of claim 19, the one or more processors further operable to maintain statistical data based on the results of each quality control task performed.

* * * * *